United States Patent [19]

Feinberg et al.

[11] Patent Number: 5,529,238
[45] Date of Patent: Jun. 25, 1996

[54] GOLD TO GOLD SUBSTRATE BONDING SYSTEM UTILIZING INTERFEROMETRIC PLANARIZATION FEEDBACK

[75] Inventors: Amatzia Feinberg, Los Angeles; Chuong V. Tran, Lawndale, both of Calif.

[73] Assignee: Xerox Corporation, Stamford, Conn.

[21] Appl. No.: 309,377

[22] Filed: Sep. 20, 1994

[51] Int. Cl.⁶ .................................................. B23K 20/02
[52] U.S. Cl. ........................ 228/116; 228/235.1; 228/44.3
[58] Field of Search .................................. 228/116, 121, 228/123.1, 44.3, 44.7, 235.1

[56] References Cited

U.S. PATENT DOCUMENTS

| | | | |
|---|---|---|---|
| 3,316,628 | 5/1967 | Lang | 228/121 |
| 3,921,885 | 11/1975 | Knox | 228/116 |
| 4,142,662 | 3/1979 | Holbrook et al. | 228/123.1 X |
| 4,895,290 | 1/1990 | Dunnrowiez | 228/116 |
| 5,046,656 | 9/1991 | Schmitt et al. | 228/123.1 |
| 5,425,491 | 6/1995 | Tanaka et al. | 228/44.7 |
| 5,473,433 | 12/1995 | Miller | 356/359 |

*Primary Examiner*—Kenneth J. Ramsey
*Attorney, Agent, or Firm*—Nola Moe McBain

[57] ABSTRACT

A bonding system with interferometric inspection for real time planarity feedback and control is used to bond two substrates at atmospheric pressure. The interferometric vision system includes a crt monitor display to display the relative planarity between two objects to be bonded. If the planarity is not sufficient, the operator, based on the information displayed, may make infitesimal adjustments to the bonding system to improve the planarity. After the desirable planarity is achieved, a heat system is activated to further facilitate bonding.

13 Claims, 5 Drawing Sheets

GOLD TO GOLD SUBSTRATE BONDING SYSTEM UTILIZING INTERFEROMETRIC PLANARIZATION FEEDBACK

BACKGROUND

This invention relates generally to bonding systems and more particularly concerns a method in which two components are bonded together using gold without other intermediate bonding materials.

Acousto-optic Bragg cells are manufactured by bonding a piezo electric substrate to an optical substrate. Cold welding systems have been used but the cold welding process is limited both in types of metals that may be used for bonding and in possible yields of working parts. For instance, indium is suited to the cold welding process, but when using indium the cold welding process must be carried out in a vacuum. In the cold welding process, the parts being cold welded together may delaminate if the parts are not sufficiently planarized with respect to each other.

Other processes which use ultrasonic welding have also been described. Ultrasonic welding allows a greater variety of metals to be used and welding pressures to be reduced by introducing heat and ultrasonic energy to the welding process. A description of ultrasonic welding apparatus and techniques is contained in *Ultrasonically Welded Piezoelectric Transducers* by John D. Larson, III and D. K. Winslow published in IEEE Transactions on Sonics and Ultrasonics, volume su-18, number 3, July 1971. The process, as described by Larson et. al., is to first coat the substrates with a flash of chromium or titanium to insure good adhesion of subsequent metals. Then the substrates are coated with the bonding metal and placed, with bonding surfaces in contact with each other, inside a heater. Once the heater has obtained the desired temperature, a static pressure and acoustic waves are applied to the substrates until bonding is completed.

While this system is an improvement upon traditional cold welding systems, excessive substrate heating and inadequate planarization of the substrates can cause improper bonding and breakage of parts.

Other attempts to achieve gold to gold bonds have been unsuccesful because the pressures to achieve bonding cause breakage of parts. Reduction of bonding pressure causes improper bonding and lack of adhesion.

The present process provides an alternative to both traditional cold welding process and traditional ultrasonic welding processes. This process uses a combination of interferometric planarization feedback, thermal agitation and profile heating to optimize the bonding process. This process produces better bonding characteristics with higher yields then previously known processes.

Further advantages of the invention will become apparent as the following description proceeds.

SUMMARY OF THE INVENTION

Briefly stated and in accordance with the present invention, there is provided a bonding system for bonding two substrates together where a chuck is used for holding two substrates, a heater is used for heating the two substrates, and a press is used for pressing the substrates together. The press is attached to the chuck and the press includes a window for receiving one of the substrates against it during pressing. A light source is arranged to shed light on the two substrates. The light source is chosen to pass through the window of the press while being reflected by the two substrates. A light collector is arranged to collect light from the light source after reflection from the two substrates and is attached to a display to display the light collected by the collector. An adjuster is also attached to the press for optimizing the planarity of the two substrates with each other.

The bonding system can be used in a bonding process to bond the two substrates by first viewing two surfaces of the two substrates under an initial pressure by looking at display means, then optimizing the planarity of the two surfaces according to the display on the display means by adjusting the adjuster and then finally increasing the initial pressure to a bonding pressure.

The bonding system and bonding process can be used to produce two substrates bonded together with a single bonding material between them.

While the present invention will be described in connection with a preferred embodiment and method of use, it will be understood that it is not intended to limit the invention to that embodiment/procedure. On the contrary, it is intended to cover all alternatives, modifications and equivalents as may be included within the spirit and scope of the invention as defined by the appended claims.

| | Alpha-Numeric List of Elements |
|---|---|
| 10 | bonding system |
| 12 | user interface/control module |
| 14 | planarizing and bonding module |
| 16 | line |
| 20 | line |
| 22 | chuck and agitation module |
| 24 | line |
| 26 | interferometric vision system |
| 28 | CRT display |
| 30 | upper substrate |
| 32 | lower substrate |
| 33 | planarization plate |
| 34 | chuck |
| 35 | upper surface |
| 36 | insulating bellows |
| 37 | lower surface |
| 38 | heated air nozzles |
| 39 | upper surface |
| 40 | bonding interface |

-continued

Alpha-Numeric List of Elements

| | |
|---|---|
| 42 | wedged viewing window |
| 43 | upper surface |
| 44 | insulated chamber |
| 46 | heated air tube |
| 47 | heated air nozzle |
| 48 | laser |
| 50 | beam |
| 52 | neutral density filter |
| 54 | polarizer |
| 56 | beam steering optic |
| 58 | beam steering optic |
| 60 | spatial filter |
| 62 | collimator |
| 64 | beam |
| 68 | beamsplitter |
| 70 | beamsplitter |
| 76 | polarizer |
| 78 | camera assembly |
| 80 | main actuator |
| 82 | fine actuator |
| 84 | central plate |
| 86 | interference pattern lines |

DETAILED DESCRIPTION OF THE INVENTION

Figure 1:
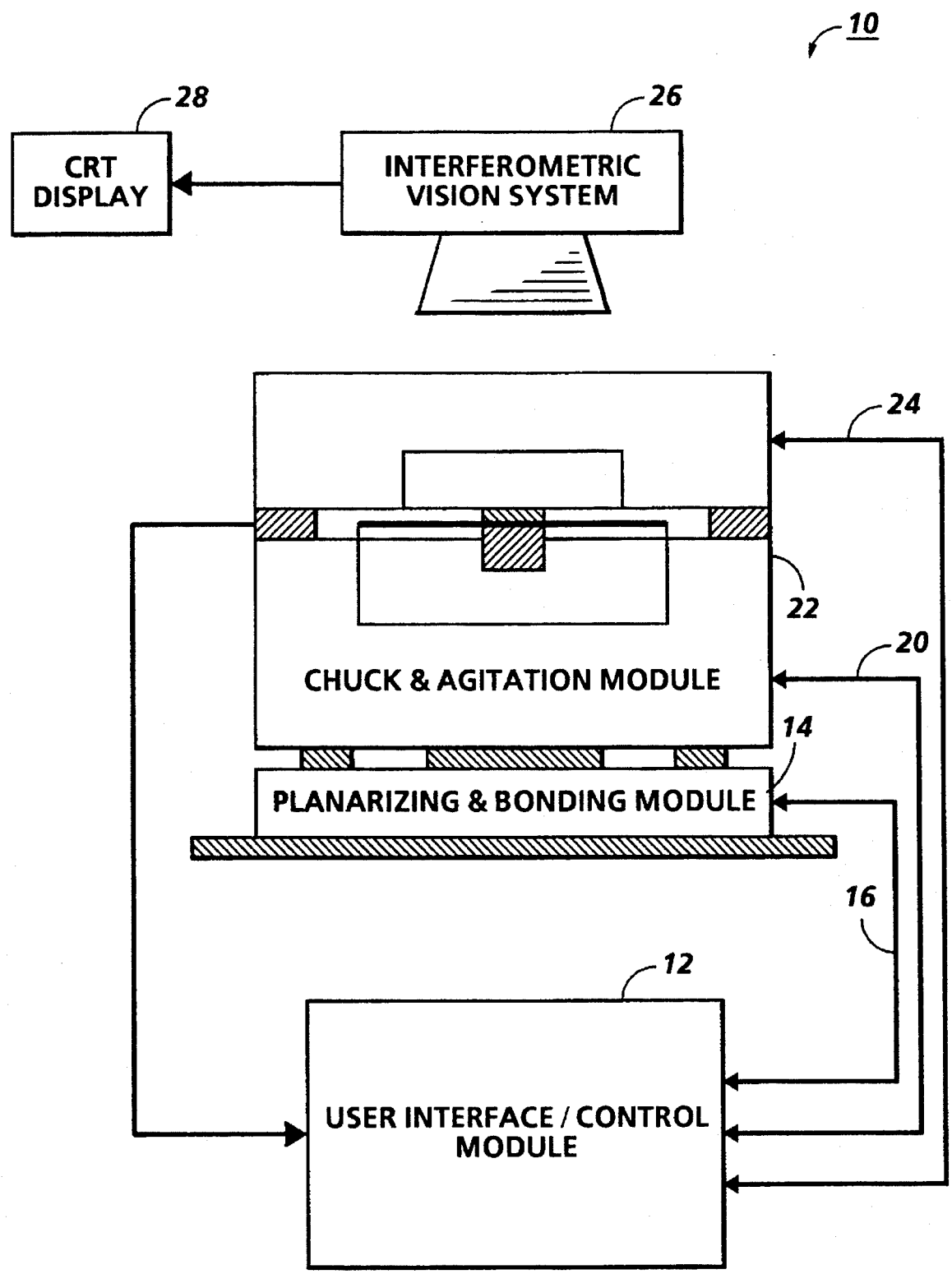
FIG. 1 is a front view of a bonding system including a user interface/control module, a planarizing and bonding module, a chuck and agitation module, an interferometric vision system, and a CRT display.

Turning now to FIG. 1 a block diagram of the bonding system 10 is shown. Operator control of the bonding system 10 is through a user interface/control module 12. The user interface/control module 12 controls operation of a planarizing and bonding module 14 through line 16, and a chuck and agitation module 22 through two lines 20, 24. Additionally, an interferometric vision system 26 provides visual data of the bonding process to a CRT display 28. Based on the visual data displayed on the CRT display 28, an operator may make infinitesimal adjustments to the bonding system 10 through the user interface/control module 12.

Figure 2:
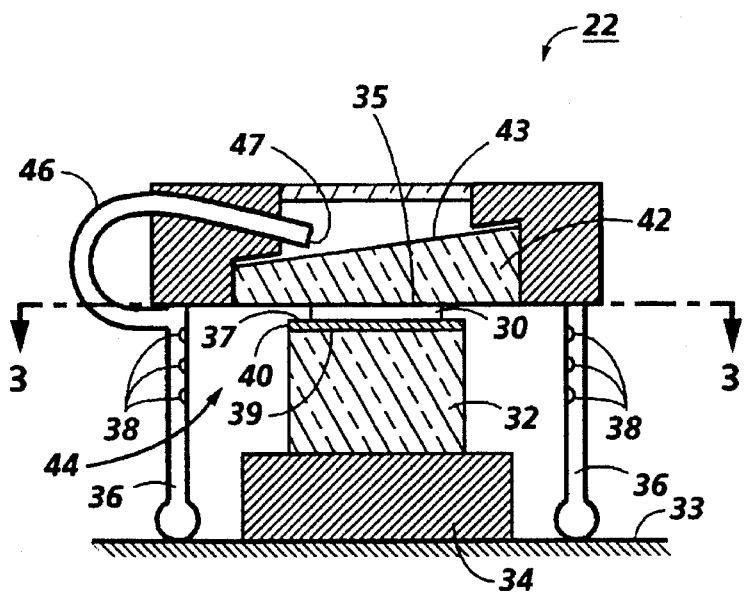
FIG. 2 is a front, internal view of the chuck and agitation module in the bonding system in FIG. 1.

FIG. 2 represents a frontal view of the chuck and agitation module 22. Upper substrate 30 and lower substrate 32 are mated at the lower surface 37 of the upper substrate 30 and the upper surface 39 of the lower substrate 32, and inserted into a chuck 34. Both the lower surface 37 and the upper surface 39 are coated with bonding materials such as gold, and when mated, the bonding materials form a bonding interface 40.

The chuck 34 is located on planarization plate 33. The planarization plate 33 mates with insulating bellows 36 containing heated air nozzles 38. When the planarization plate 33 is mated with the insulating bellows 36, an insulated chamber 44 is formed. The heated air nozzles 38 are aimed inside the insulated chamber 44 at the mated substrates 30, 32. The upper substrate 30 has its upper surface 35 pressed up against a wedged viewing window 42. Heated air tube 46 is also attached to the insulating bellows 36 with a heated air nozzle 47 directed at the upper surface 43 of a wedged viewing window 42. Between the mated substrates 30,32 is a bonding interface 40.

Figure 3:
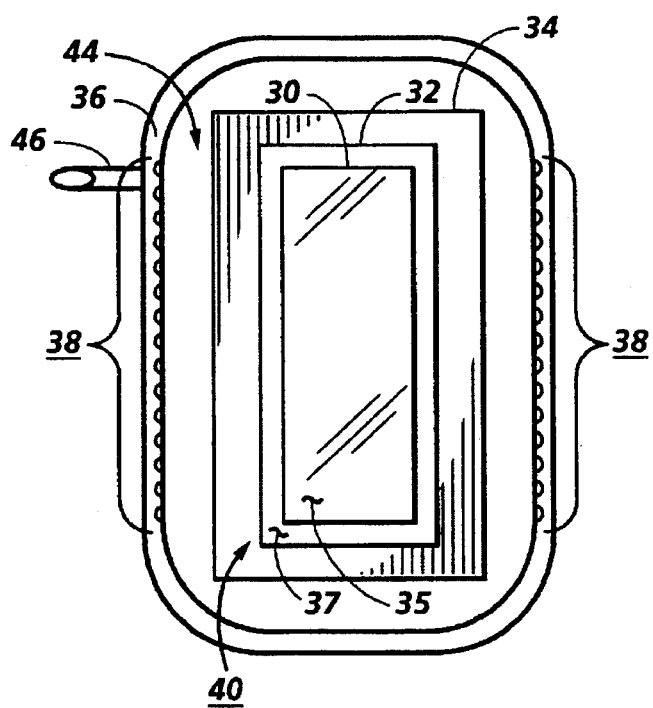
FIG. 3 is a top view of the chuck and agitation module in FIG. 2.

FIG. 3 shows a top view of the mated upper substrate 30 and the lower substrate 32 as viewed from section line 3—3 in FIG. 2. On opposing sides of the mated upper substrate 30 and lower substrate 32 are the heated air nozzles 38.

Figure 4:
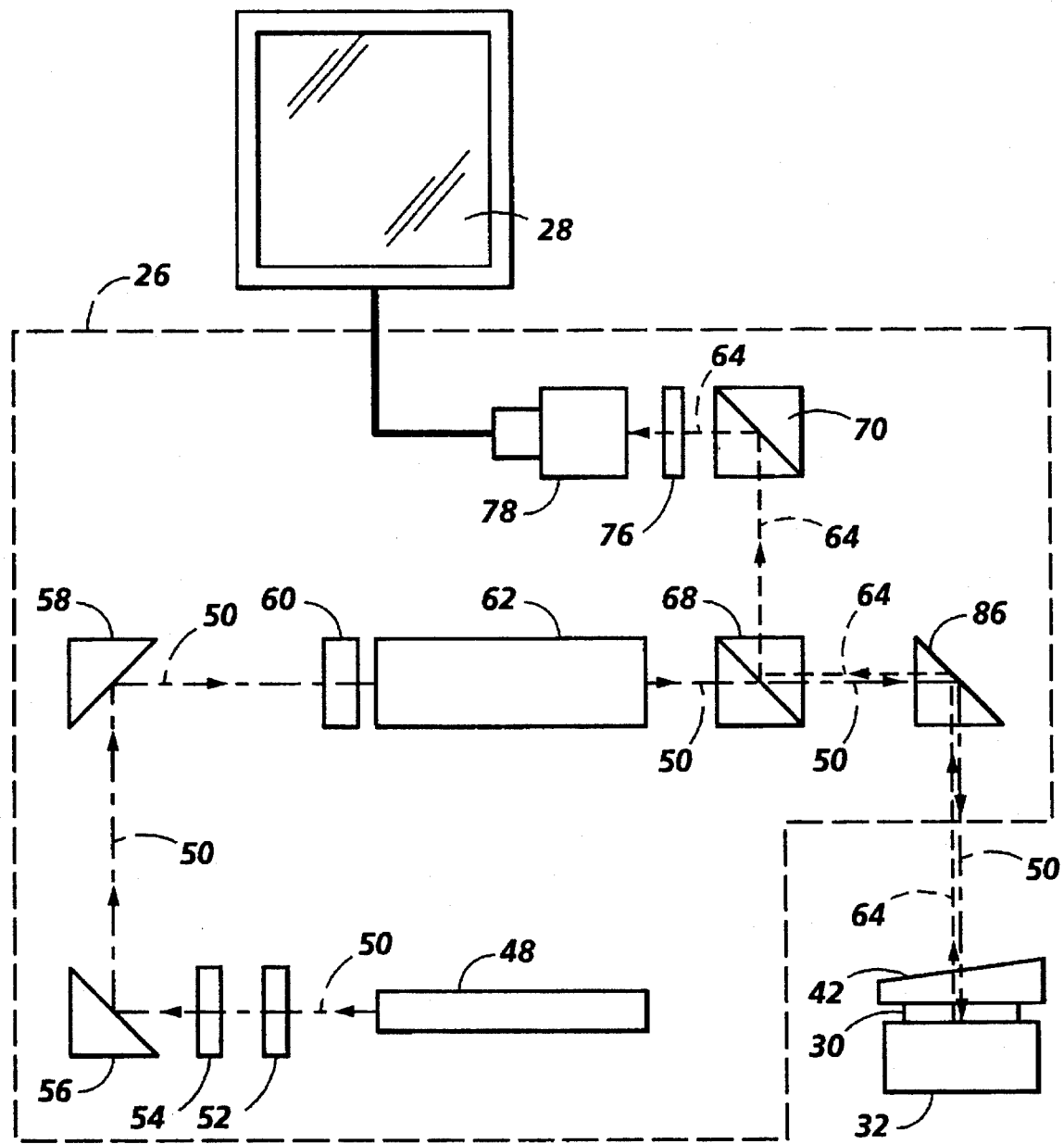
FIG. 4 is an optical schematic of the interferometric vision system and the CRT display of the bonding system in FIG. 1.

FIG. 4 shows a schematic of the interferometric vision system 26 operating with the wedged viewing window 42 and the planarizing and bonding module 14. A light source 48 sends a beam 50 through a neutral density filter 52, a polarizer 54, two beam steerers 56, 58 and spatial filter 60 before hitting a collimator 62. When the beam 50 emerges from the collimator 62 it passes through a beamsplitter 68. Beam 50 then travels through a right angle prism 86 and is directed through the wedged viewing window 42. After passing through the wedged viewing window 42, beam 50 is bounced back from the lower surface 37 and the upper surface 3 of the upper substrate 30 which is inside the planarizing and bonding module 14 as beam 64. Beam 64 is then returned to the right angle prism 86 and then is steered by two beamsplitters 68, 70. Beam 64 then travels through a polarizer 76 and camera assembly 78 before being displayed on a CRT display 28.

In operation the interferometric vision system 26 uses the interference of two reflected portions, from the lower surface 37 of upper substrate 30 and the upper surface 35 of upper substrate 30, of a coherent light. When the two reflected portions are recombined they produce interference fringes which describe the separation between the two surfaces. To work correctly, the beam 50 must be chosen to have the correct coherent length. The coherent length is the distance the beam 50 travels while remaining in phase. If the distance between the two reflecting surfaces is two inches apart, the beam 50 must have a coherent length of at least two inches. Most monochromatic light sources such as a mercury lamp, neon lamp or a laser light source would satisfy this requirement. If the distance is very small, then the coherent length of the beam 50 may be very short, however if the beam 50 has a long coherent length compared to the distance between the reflecting surfaces, then interference from other reflecting surfaces in the path will show up in the results. Therefore, it is important that the coherent length of the beam 50 be longer then the distance between the reflecting surfaces but not unduly so. For example, fluorescent light would be appropriate for looking at two surfaces very close together because the short coherent length would not introduce interference from other surfaces.

Figure 5:
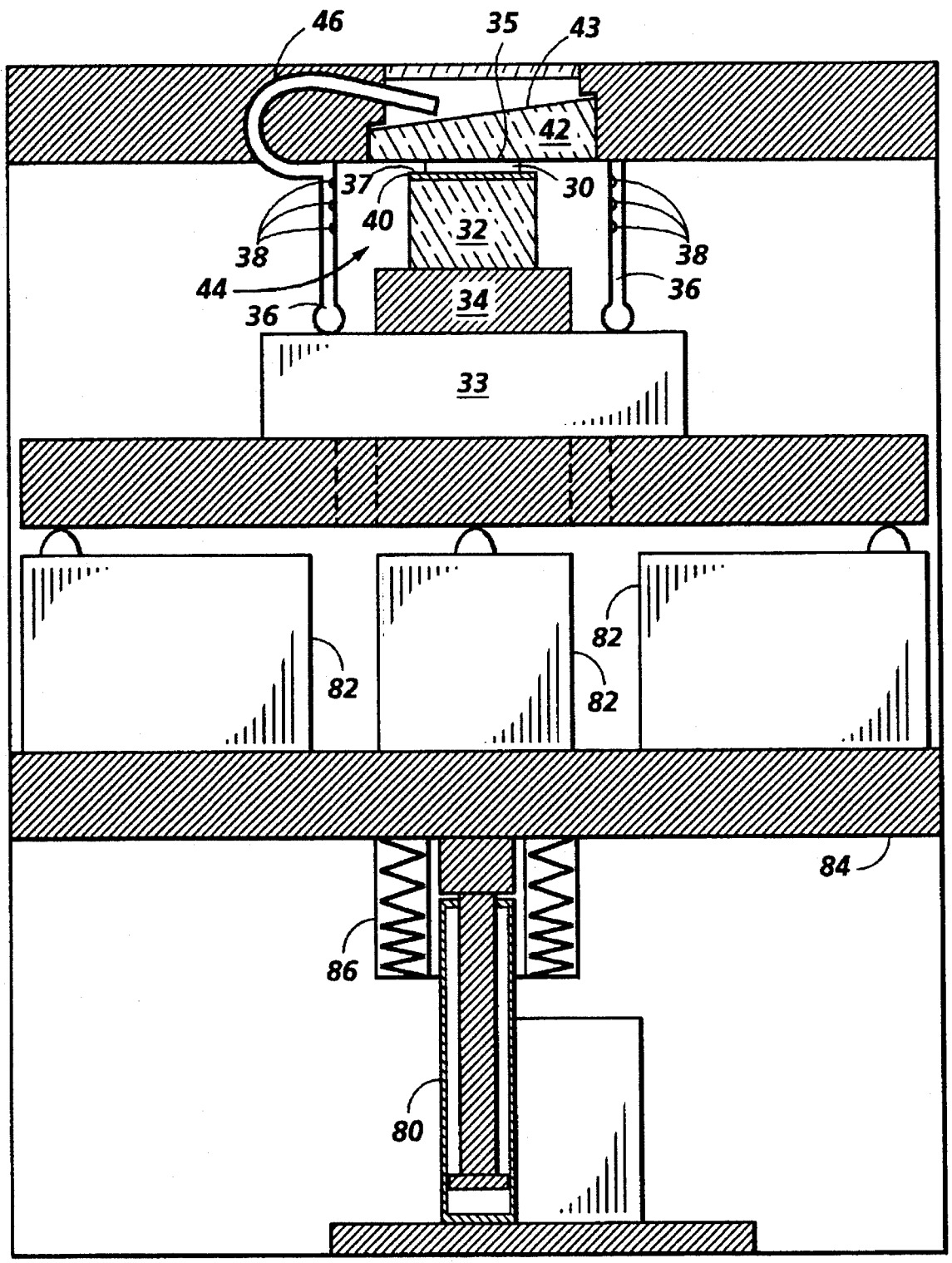
FIG. 5 is a front, internal view of the chuck and agitation module with planarizing and bonding module of the bonding system in FIG. 1.

FIG. 5 shows a diagram of the chuck and agitation module 22 with the planarizing and bonding module 14. The chuck and agitation module 22 includes the upper substrate 30 and lower substrate 32 mounted on the chuck 34. The insulated chamber 44 is formed by the insulating bellows 36, wedged viewing window 42, and planarization plate 33. Heating takes place through the heated air nozzles 38 in the insulating bellows 36. The upper substrate 30 is pressed against the wedged viewing window 42 by the planarizing and bonding module 14.

The planarizing and bonding module 14 includes both a main actuator 80 and fine actuators 82. The main actuator 80 and the fine actuators 82 can use a motorized drive or a piezo actuator or an electro-pneumatic mechanism. A central plate 84 rides on the main actuator. The fine actuators 82 are mounted on the central plate 84 and utilize a three point configuration in floating contact with the chuck and agitation module 22. Each of the fine actuators 82 are individually adjustable by the operator through the user interface/control module 12 and line 16 which controls the planarizing and bonding module 14.

The bonding process works as follows. An upper substrate 30 whose lower surface 37 has been coated with a bonding material and a lower substrate 32 whose upper surface 39 has been coated with a bonding material are mated and placed into the chuck 34. In this example, the bonding material is gold. The upper substrate 30 is coated with a thin film of a clear liquid on the surface to be pressed against the wedged viewing window 42. This is done to prevent the upper substrate 30 from adhering to the wedged viewing window 42 during the bonding process. Any clear, thin film that can withstand the temperatures in the chuck and agitation module 22 such as vegetable or baby oil can be used. The operator then initiates the bonding process with the user interface/control module 12. The user interface/control module 12 causes the main actuator 80 to preload the chuck 34 by pressing the upper substrate 30 against the wedged viewing window 42 with a pressure of approximately 25 psi to 200 psi depending upon the substrates used.

Figure 6:
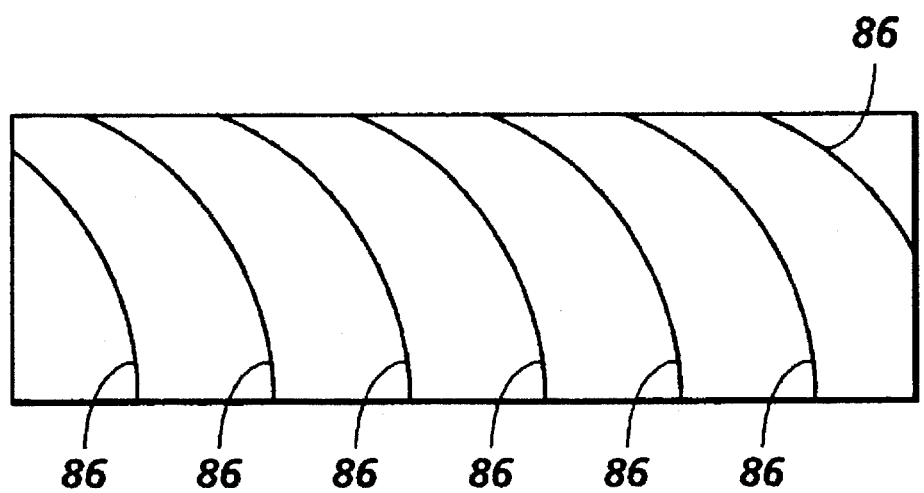
FIG. 6 is the displayed output on the CRT display from the interferometric vision system when planarization is inadequate for bonding.
Figure 7:
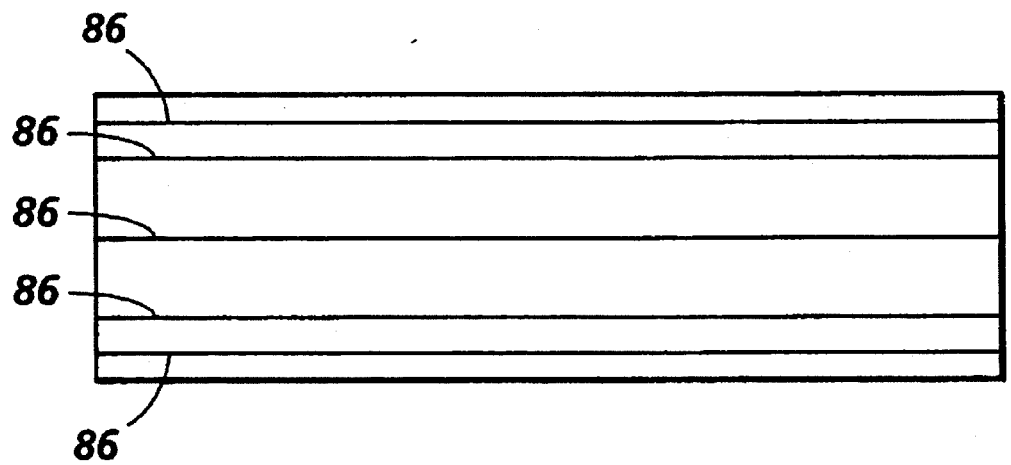
FIG. 7 is the displayed output on the CRT display from the interferometric vision system when planarization is adequate for bonding.

At this point, the interferometric vision system 26 is turned on using a light with a relatively long coherent length to check the planarization and cleanliness at the bonding interface 40 of the parts. FIG. 6 illustrates a typical interference pattern for the bonding interface 40 when it is poorly planarized. FIG. 6 shows many interference pattern lines 86 which are not parallel with each other indicating poor planarization. FIG. 7 illustrates a typical interference pattern for the bonding interface 40 after planarization has been achieved. The interference pattern lines 86 have been minimized and are all parallel with each other. The operator looks at the pattern displayed on the CRT display 28 and makes adjustments to the fine actuators 82 by entering input into the user interface/control module 12. The operator continues to make planarization adjustments with the fine actuators 82 until the interference pattern lines have been minimized in number and become parallel as illustrated in FIG. 7.

The planarization procedure is verified with a light of a very short coherent length to check the planarization of the upper substrate 30 with respect to the wedged viewing window 42.

Bonding will occur at a pressure of approximately 50 psi to 1000 psi, depending upon the parts used. As the pressure is raised, the interferometric vision system 26 is used to insure that the bonding interface 40 retains good planarization characteristics. When both the final pressure is correct and planarization is complete the position of the main actuator 80 and the fine actuators 82 are locked.

After locking the main actuator 80 and the fine actuators 82 into place the chuck and agitation module 22 is activated to provide warm air through the heated air nozzles 38 to the insulated chamber 44. The warm air is directed by the heated air nozzles 38 towards the upper substrate 30 and the lower substrate 32 to provide uniform heating of the upper substrate 30 and the lower substrate 32. The upper substrate 30 and the lower substrate 32 are heated through the diffusion of heat from the heated air nozzles 38. Non-uniform heating of the upper substrate 30 and the lower substrate 32 results in deformation of the bonding interface 40 as different areas of the upper substrate 30 or lower substrate 32 expand at different rates. To further control uniformity of heating expansion, the heated air nozzle 47 directs warm air to the wedged viewing window 42 which the upper substrate 30 is pressed up against. The heated air flowing to the heated air nozzles 38 and the heated air nozzle 47 should preferably be at a temperature of approximately between one hundred degrees centigrade and three hundred degrees centigrade and the insulated chamber 44 should also reach a temperature of approximately between one hundred degrees centigrade and three hundred degrees centigrade depending upon the bonding media used. To avoid cracking of the upper substrate 30 and the lower substrate 32 or deformation of the bonding interface 40 due to too rapid heating the heating rate in the insulated chamber 44 should remain below 0.2 degrees per second.

Once the bonding temperature and pressure have been obtained, the pressure and temperature in the insulated chamber 44 must be maintained for at least two minutes to insure that bonding occurs. After the bonding time has elapsed, the temperature of the insulated chamber 44 is lowered by lowering the temperature of air coming from the heated air nozzles 38, with pressure still applied to the upper substrate 30 and the lower substrate 32. Again, to avoid weakening of the bond or cracking of the upper substrate 30 and the lower substrate 32 due to cooling contraction of the upper substrate 30 or the lower substrate 32, the cooling rate of the insulated chamber 44 should not exceed 0.2 degrees per second.

Once the insulated chamber 44 has reached the cool down temperature of 60 percent of the bond temperature, the pressure on the upper substrate 30 and the lower substrate 32 is released by lowering the main actuator 80. The upper substrate 30 and the lower substrate 32 remain in the insulated chamber 44 until cooldown is finished and the insulated chamber 44 has reached a temperature of twenty-one degrees centigrade. At this time the bonding process is completed and the bonded upper substrate 30 and lower substrate 32 may be removed from the bonding system 10.

The use of the interferometric vision system 26 to display the planarity of the bonding interface 40 allows submicron adjustments to be made and insures the good planarity of the bonding interface 40. Good planarity is critical to the bonding process because it allows much greater pressures to be obtained in the bonding process without breakage of the fragile upper substrate 30 or lower substrate 32. The combination of heat and higher pressures facilitates direct gold to gold bonding without the need for intermediate, softer metals such as indium, with no vacuum.

We claim:

1. A bonding system for bonding a first and second substrate, each substrate having a bonding surface at least partially covered with a bonding material, together comprising:

A) chuck means for holding the first and second substrates;

B) heating means operably attached to said chuck means for heating the first and second substrates;

C) pressing means operably attached to said chuck means for pressing the first and second substrates together, said pressing means including a stationary window for receiving one of said substrates against it during pressing operation;

D) a light source arranged to shed light upon the first substrate, said light source chosen to at least partially pass through the window of said pressing means while being at least partially reflected by the first and second substrates;

E) collecting means arranged to collect light from said light source after reflection from the first substrate;

F) display means operably attached to said collecting means for displaying the light collected by said collecting means; and adjusting means operably attached between said pressing means for optimizing the planarity of the first and second substrates with each other.

2. A bonding system of claim 1 wherein said light source comprises a mercury lamp.

3. A bonding system of claim 1 wherein said light source comprises a neon lamp.

4. A bonding system of claim 1 wherein said light source comprises a laser light source.

5. A bonding system of claim 1 wherein said collecting means comprises a camera assembly.

6. A bonding system of claim 1 wherein said display means comprises a crt display.

7. A bonding system of claim 1 further comprising a second light source arranged to shed light upon the window and the first substrate, said light source chosen to be at least partially reflected by the window and the first substrate, said light source also arranged such that said reflected light is collected by said collecting means.

8. A bonding process using the apparatus as described in claim 1 comprising:
   A) providing a first and a second substrate, each substrate with a bonding surface at least partially covered with a bonding material and a pressing surface opposed to the bonding surface, said substrates placed such that the bonding surfaces are adjacent to each other,
   B) applying an initial pressure to the substrates which presses the bonding surfaces towards each other,
   C) viewing the bonding and pressing surfaces of the first substrate under an initial pressure by looking at the display means,
   D) optimizing planarity of the two surfaces according to patterns on the display means by adjusting said adjusting means, and
   E) increasing the initial pressure to a bonding pressure.

9. A bonding process using the apparatus as described in claim 5 comprising:
   A) providing a first and a second substrate, each substrate with a bonding surface at least partially covered with a bonding material and a pressing surface opposed to the bonding surface, said substrates placed such that the bonding surfaces are adjacent to each other,
   B) applying an initial pressure to the substrates which presses the bonding surfaces towards each other,
   C) viewing the bonding and pressing surfaces of the first substrate under an initial pressure by looking at the display means,
   D) optimizing planarity of the two surfaces according to the patterns on the display means by adjusting said adjusting means,
   E) viewing a surface of one of the substrates in contact with the stationary window and the stationary window under an initial pressure,
   F) optimizing planarity of the two surfaces according to the patterns on the display means by adjusting said adjusting means,and
   G) increasing the initial pressure to a bonding pressure.

10. A bonding process using the apparatus as described in claim 5 comprising:
   A) providing a first and a second substrate, each substrate with a bonding surface at least partially covered with a bonding material and a pressing surface opposed to the bonding surface, said substrates placed such that the bonding surfaces are adjacent to each other,
   B) applying an initial pressure to the substrates which presses the bonding surfaces towards each other,
   C) viewing the bonding and pressing surfaces of the first substrate under an initial pressure by looking at the display means,
   D) optimizing planarity of the two surfaces according to the patterns on the display means by adjusting said adjusting means,
   E) viewing a surface of one of the substrates in contact with the stationary window and the stationary window under an initial pressure,
   F) optimizing planarity of the two surfaces according to the patterns on the display means by adjusting said adjusting means, and
   G) repeating steps A–F until optimal planarization is obtained between both the two substrates and the stationary window and one of the substrates.
   H) increasing the initial pressure to a bonding pressure.

11. A bonding process using the apparatus as described in claim 1 comprising:
   A) providing a first and a second substrate, each substrate with a bonding surface at least partially covered with gold and a pressing surface opposed to the bonding surface, said substrates placed such that the bonding surfaces are adjacent to each other,
   B) applying an initial pressure to the substrates which presses the bonding surfaces towards each other,
   C) viewing the bonding and pressing surfaces of the first substrate under an initial pressure by looking at the display means,
   D) optimizing planarity of the two surfaces according to patterns on the display means by adjusting said adjusting means, and
   E) increasing the initial pressure to a bonding pressure.

12. A bonding process using the apparatus as described in claim 5 comprising:
   A) providing a first and a second substrate, each substrate with a bonding surface at least partially covered with gold and a pressing surface opposed to the bonding surface, said substrates placed such that the bonding surfaces are adjacent to each other,
   B) applying an initial pressure to the substrates which presses the bonding surfaces towards each other,
   D) viewing the bonding and pressing surfaces of the first substrate under an initial pressure by looking at the display means,
   E) optimizing planarity of the two surfaces according to the patterns on the display means by adjusting said adjusting means,
   F) viewing the pressing surface of the first substrate and the surface of the stationary window in contact with the pressing surface under an initial pressure,
   G) optimizing planarity of the two surfaces according to the patterns on the display means by adjusting said adjusting means,and
   H) increasing the initial pressure to a bonding pressure.

13. A bonding process using the apparatus as described in claim 5 comprising:
   A) providing a first and a second substrate, each substrate with a bonding surface at least partially covered with gold and a pressing surface opposed to the bonding surface, said substrates placed such that the bonding surfaces are adjacent to each other,
   B) applying an initial pressure to the substrates which presses the bonding surfaces towards each other,
   C) viewing the bonding and pressing surfaces of the first substrate under an initial pressure by looking at the display means,
   D) optimizing planarity of the two surfaces according to the patterns on the display means by adjusting said adjusting means,
   E) viewing the pressing surface of the first substrate and the surface of the stationary window in contact with the pressing surface under an initial pressure,
   F) optimizing planarity of the two surfaces according to the patterns on the display means by adjusting said adjusting means,and
   G) repeating steps A–F until optimal planarization is obtained between both the two substrates and the stationary window and one of the substrates.

* * * * *